(12) United States Patent
Messana et al.

(10) Patent No.: US 7,411,009 B1
(45) Date of Patent: Aug. 12, 2008

(54) CURE ACCELERATORS FOR ANAEROBIC CURABLE COMPOSITIONS

(75) Inventors: Andrew D. Messana, Newington, CT (US); Philip T. Klemarczyk, Canton, CT (US); Karen R. Brantl, West Springfield, MA (US)

(73) Assignee: Henkel Corporation, Rocky Hill, CT (US)

( * ) Notice: Subject to any disclaimer, the term of this patent is extended or adjusted under 35 U.S.C. 154(b) by 418 days.

(21) Appl. No.: 11/072,420

(22) Filed: Mar. 7, 2005

Related U.S. Application Data

(63) Continuation-in-part of application No. 10/157,804, filed on May 31, 2002, now Pat. No. 6,958,368.

(51) Int. Cl.
  *C09J 4/00* (2006.01)
(52) U.S. Cl. .............. 523/176; 526/204; 526/205; 526/217; 526/227; 526/230; 526/320; 526/321; 526/323.1
(58) Field of Classification Search ........... 523/176; 526/204, 205, 217, 227, 230, 320, 321, 323.1
See application file for complete search history.

(56) References Cited

U.S. PATENT DOCUMENTS

| | | | | |
|---|---|---|---|---|
| 3,970,505 | A | 7/1976 | Hauser et al. | 156/331 |
| 4,180,640 | A | 12/1979 | Melody et al. | 526/323.1 |
| 4,287,330 | A | 9/1981 | Rich | 526/270 |
| 4,321,349 | A | 3/1982 | Rich | 526/270 |
| 4,764,239 | A | 8/1988 | Jacobine et al. | 156/307 |
| 5,411,988 | A | 5/1995 | Bockow et al. | 514/560 |
| 5,444,104 | A | 8/1995 | Waknine | 522/24 |
| 3,218,305 | A | 11/1995 | Krieble | 260/89.5 |
| 5,605,999 | A | 2/1997 | Chu et al. | 528/24 |
| 5,756,650 | A | 5/1998 | Kawamonzen et al. | 528/353 |
| 5,811,473 | A | 9/1998 | Ramos et al. | 523/176 |
| 6,150,479 | A * | 11/2000 | Klemarczyk et al. | 526/90 |
| 6,495,298 | B1 | 12/2002 | Fujishiro et al. | 430/7 |
| 6,583,289 | B1 | 6/2003 | McArdle et al. | 548/123 |
| 6,835,762 | B1 | 12/2004 | Kelmarczyk et al. | 523/176 |

FOREIGN PATENT DOCUMENTS

| | | |
|---|---|---|
| DE | 1 817 989 | 9/1976 |
| DE | 2 806 701 | 1/1993 |
| EP | 0 943 670 A1 * | 9/1999 |
| JP | 07-308757 | 9/1969 |
| JP | 05-105847 | 6/1991 |
| WO | 98/13704 | 1/1999 |
| WO | WO 00/40664 | 7/2000 |

OTHER PUBLICATIONS

R.D. Rich, "Anaerobic Adhesives" in *Handbook of Adhesive Technology*, 29, 467-479 A. Pizzi and K.L. Mittal, eds., Marcel Dekker, Inc., New York (1994).

F.J. Boerio, et al., "Surface-Enhanced Raman Scattering from Model Acrylic Adhesive Systems", American Chemical Society (1990).

* cited by examiner

*Primary Examiner*—Helen L. Pezzuto
(74) *Attorney, Agent, or Firm*—Steven C. Bauman

(57) ABSTRACT

The present invention relates to new cure accelerators for anaerobic curable compositions. These anaerobic cure accelerators are generally sulfonimide derivatives and sulfonamide derivatives.

9 Claims, 2 Drawing Sheets

CURE ACCELERATORS FOR ANAEROBIC CURABLE COMPOSITIONS

RELATED U.S. APPLICATION DATA

This application continues in part from U.S. patent application Ser. No. 10/157,804, filed May 31, 2002, now U.S. Pat. No. 6,958,368 B1, the entire disclosure of which is hereby incorporated herein by reference.

BACKGROUND OF THE INVENTION

1. Field of the Invention

The present invention relates to new cure accelerators for anaerobic curable compositions. These anaerobic cure accelerators are generally sulfonimide derivatives and sulfonamide derivatives.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), acetyl phenylhydrazine ("APH"), maleic acid ("MA"), and quinones, such as napthaquinone and anthraquinone. See e.g., U.S. Pat. Nos. 3,218,305 (Krieble), 4,180,640 (Melody), 4,287,330 (Rich) and 4,321,349 (Rich).

Saccharin and APH have been used as standard cure accelerator components in anaerobic adhesive cure systems since the inception of the technology, and has been well studied in that connection. Hitherto, it was believed that the nitrogen-hydrogen bond off the heterocycle ring was necessary to achieve performance under anaerobic conditions, as early studies substituting the hydrogen with an alkyl group proved to be ineffective. See F. J. Boerio et al., "Surface-Enhanced Raman Scattering from Model Acrylic Adhesive Systems", *Langmuir*, 6, 721-27 (1990), in which it is stated "[t]hese salts [of saccharin] are thought to be important factors in the curing reaction of the adhesive."

And while anaerobic curable compositions having cure components including saccharin, DE-p-T and cumene hydroperoxide ("CHP") display good performance on metal substrates, such compositions do not display as impressive performance on glass substrates. Thus, there exists a specific need to tailor anaerobic curable compositions to perform well on such substrates.

Recently, Henkel Corporation was granted U.S. Pat. No. 6,835,762 (Klemarczyk), which defines an invention directed to an anaerobic curable composition, comprising:

(a) a (meth)acrylate component;
(b) an anaerobic cure-inducing composition; and
(c) an anaerobic cure accelerator compound having the linkage —C(=O)—NH—NH— and an organic acid group on the same molecule. The composition is substantially free of acetyl phenyl hydrazine and maleic acid, and the anaerobic cure accelerator compound excludes 1-(2-carboxyacryloyl)-2-phenylhydrazine.

There continues to be an on-going desire to find alternative technologies for accelerating the cure of anaerobic curable compositions, to differentiate existing products and provide supply assurances in the event of shortages or cessation of supply of raw materials. Accordingly, it would be desirable to identify new materials, which function as accelerators in the cure of anaerobic curable compositions.

SUMMARY OF THE INVENTION

The present invention provides new cure accelerators for anaerobic curable compositions. The anaerobic curable compositions are typically used as adhesives or sealants.

The anaerobic cure accelerators are saccharin derivatives within structure I

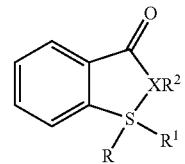

where R and $R^1$ may or may not be present, but when at least one is present it is S=O; X is N or S; and $R^2$ is hydroxyl or alkoxy.

The addition of these materials into anaerobic curable compositions as a replacement for some or all of the amount of conventional anaerobic cure accelerators (such as o-benzoic sulfimide or saccharin, used interchangeably throughout) surprisingly provides at least comparable cure speeds and physical properties for the reaction products formed therefrom.

This invention also provides anaerobic curable compositions and anaerobic curable composition systems prepared with such cure accelerators, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

Figure 1:
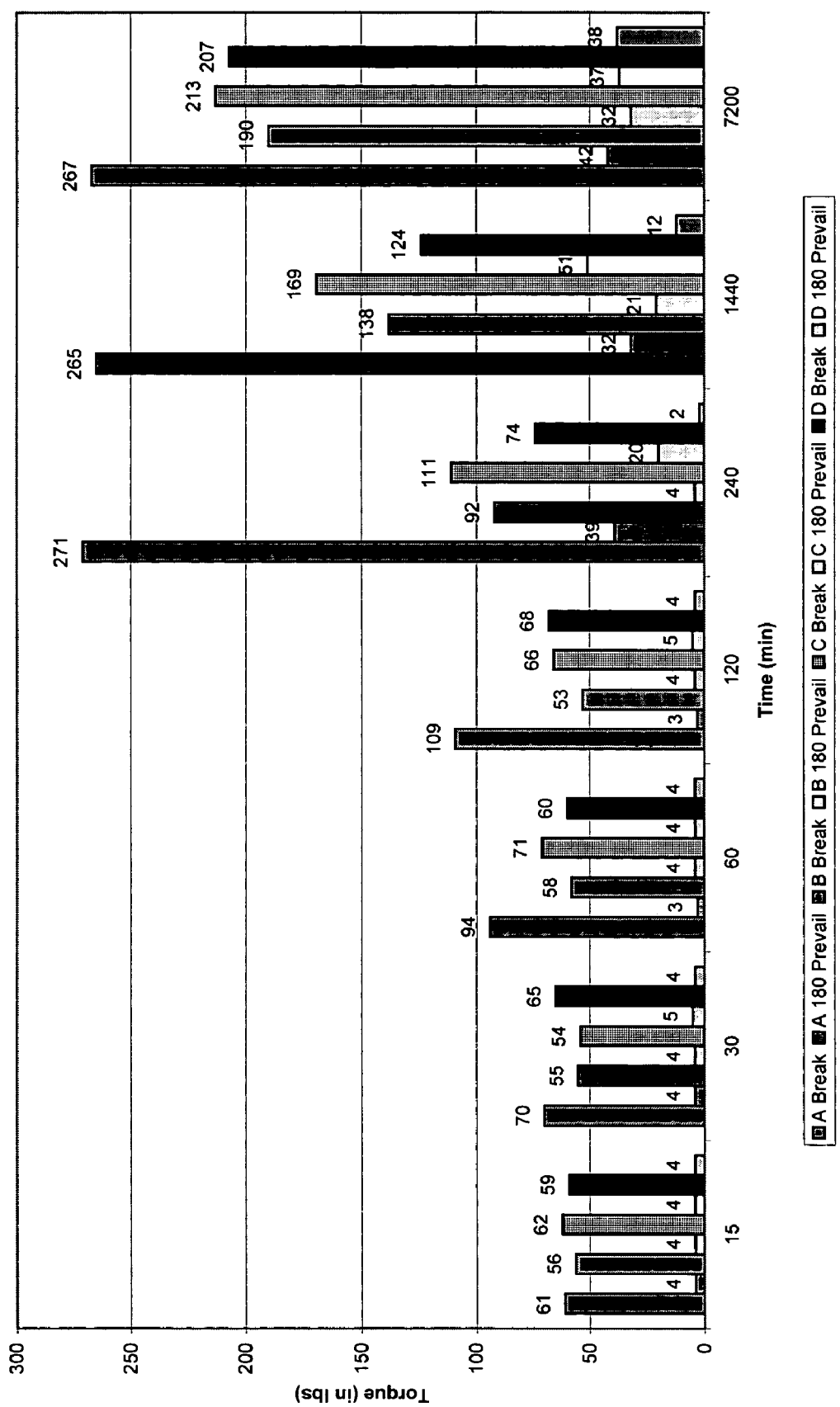
FIG. 1 depicts a bar chart of breakloose torque and 180° prevail torque versus fixture time on threaded steel fasteners for anaerobic curable compositions, with and without saccharin NHS, or NTS.

The present invention provides anaerobic cure accelerators, which are generally sulfinimide derivatives and sulfonimide derivatives. The addition of such compounds as cure accelerators into anaerobic curable compositions as a replacement for some or all of the amount of conventional cure accelerators, namely saccharin, surprisingly provides at least comparable cure speeds and physical properties for the reaction products formed.

The inventive cure accelerators may be within structure I

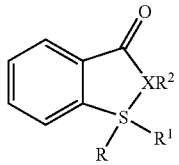

where R and $R^1$ may or may not be present, but when at least one is present it is =O; X is N or S; and $R^2$ is hydroxyl or alkoxy. More specifically, R and $R^1$ should be present and are S=O; X is N; and R is hydroxyl or an alkoxy ether, such as an alkoxy cycloaliphatic ether.

Particular examples of such accelerators thus include the following sulfonamide derivatives:

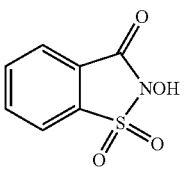

N-Hydroxy saccharin
(NHS)

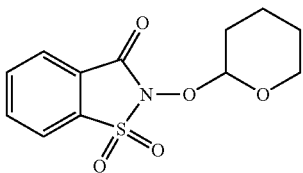

2-(N-Tetrahydropyranyloxy)-1,2-
benzisothiazol-3(2H)-one
1,1-dioxide (NTS)

Saccharin is o-benzoic sulfimide. The N-hydroxy derivative thereof is structure II, N-hydroxy saccharin ("NHS"); the N-oxytetrahydropyranyl derivative thereof is structure III, 2-(N-tetrahydropyranyloxy)-1,2-benzisothiazol-3(2H)-one-1,1-dioxide ("NTS"). These saccharin derivatives are useful in, or as primers for use with, anaerobic curable compositions as a replacement for some of or all of the saccharin typically used as an accelerator. The saccharin derivatives display good solubility, stability and anaerobic activity in anaerobic curable compositions.

Anaerobic curable compositions generally are based on a (meth)acrylate component, together with an anaerobic cure-inducing composition. In the present invention, such anaerobic curable compositions are desirably substantially free of saccharin and include the inventive cure accelerators within structure I.

(Meth)acrylate monomers suitable for use as the (meth) acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, other free radical co-accelerators, inhibitors of free radical generation, as well as metal catalysts, such as iron and copper.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-dit-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional co-accelerators of free radical polymerization may also be used in conjunction with the inventive anaerobic cure accelerators. Such co-accelerators are typically of the hydrazine variety (e.g., APH), as disclosed in the '330 and '349 patents.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

The inventive anaerobic cure accelerators may be used in amounts of about 0.1 to about 10 percent by weight, such as about 1 to about 5 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 3 percent by weight.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate. Or, the inventive anaerobic cure accelerator may be used as a primer itself. See e.g. U.S. Pat. No. 5,811,473 (Ramos).

In addition, this invention provides a method of preparing an anaerobic curable composition, a step of which includes mixing together a (meth)acrylate component and an anaerobic cure-inducing composition, desirably substantially free of saccharin, but including the inventive anaerobic cure accelerators within structure I.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a cure accelerator for anaerobic curable compositions compounds within structure I.

And the present invention provides a method of using an anaerobic cure accelerator within structure I as a replacement for some or all of the saccharin as a cure accelerator for anaerobic curable compositions. Of course, the present invention also provides for a bond formed between two mated substrates with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate certain sulfonamide derivatives as a replacement for some or all of saccharin in anaerobic curable compositions.

These new cure systems were compared with control formulations containing the conventional cure components, APH and saccharin by 82° C. accelerated stability, fixture time, and one hour/24 hour adhesion tests on nut/bolt specimens.

Two sulfonamide derivatives—II and III—were prepared and evaluated to determine their suitability as a cure accelerator in the anaerobic curable compositions.

The inventive sulfonamide anaerobic cure accelerators were prepared in accordance with the synthetic scheme depicted in FIG. 3, and as described below. PEGMA, MA, saccharin, DE-p-T, DM-o-T, CHP, and APH were obtained commercially from Acros Organics and Aldrich Chemical Co.

Proton Nuclear Magnetic Resonance ("$^1$H NMR") analyses were performed using a Varian 300 Hz Gemini Spectrophotometer. Infrared ("IR") spectral analyses were performed on neat samples using a Perkin Elmer Instruments Spectrum One FT-IR Spectrophotometer with a Universal ATR Sampling Accessory.

A. General Synthesis for Sulfonamide Derivatives

To a 200 mL four neck reaction flask, equipped with a condenser, nitrogen purge, thermocouple and magnetic stirring was added 2-[{(N-tetrahydropyranyloxy)amino}sulfonyl]benzoic acid (7 g, 23.2 mmol) to dry tetrahydrofuran ("THF") (100 mL). The stirred solution was cooled to a temperature near −10° C., at which isobutyl chloroformate (4.4 g, 32.4 mmol) and triethylamine (4.52 ml, 32.4 mmol) were added. After five minutes, the mixture was allowed to warm to room temperature, at which temperature a white precipitate was observed to form. The precipitate was collected by filtration and re-crystallized to provide a white solid, NTS.

To a 100 ml 3-neck flask equipped with a condenser, thermocouple and magnetic stirring was charged NTS (5.0 g, 17.65 mmol) followed by THF (36.4 ml). The solution was warmed to a temperature of 45° C., at which temperature water (9.2 ml) and trifluoroacetic acid (0.4 g, 3.51 mmol) were added. The solution was stirred for a period of time of 7.5 hours at a temperature of 45-50° C., after which water (18.2 ml) was added and the entire mixture was concentrated to a small volume. A solid suspension resulted, and was collected and washed with cold water and then cold diethyl ether. The resulting solid was dried and re-crystallized to provide a crystalline white solid, NHS.

NHS, II—Yield=1.56 g (44%); M.P. (DSC)=199° C. decomposes; $^1$H NMR (CDCl$_3$ with DMSO-d$_6$) δ 11.25 (br s, 1, N—OH), 8.05 (d, 2, Ar—H), 7.9 (m, 2, Ar—H), 2.4 (s, 1, N—OH); IR (HATR Press) 3215, 3095, 1724, 1344, 1190, 930, 783, 746, 673 cm$^{-1}$.

NTS, III—Yield=5.33 g (81%); M.P. (DSC)=122-124° C.; $^1$H NMR (CDCl$_3$) δ 8.10 (d, 1, Ar—H), 7.8-8.0 (m, 3, Ar—H), 5.45 (s, 1, C—H), 4.4 (m, 1, O—CH$_2$), 3.75 (d, 1, CH$_2$), 2.05 (d, 1, CH$_2$), 1.9 (m, 1, O—CH$_2$), 1.75 (m, 2, CH$_2$)); IR (HATR Press) 3096, 2957, 2852, 1751, 1340, 1189, 925, 749, 674 cm$^{-1}$.

B. Adhesive Formulations with Sulfonamide Derivatives

Samples A-D were prepared from the noted components in the listed amounts, by mixing with a mechanical stirrer in glass vials.

TABLE 1

| COMPONENTS | | Sample/(Amt./wt. %) | | | |
|---|---|---|---|---|---|
| Type | Identity | A | B | C | D |
| (Meth)acrylate | Base Anaerobic | 91.1 | 91.1 | 91.1 | 91.1 |
| | PEG 200 MO | 2.52 | 6.3 | 2.52 | 2.52 |
| Conventional Accelerator | Saccharin | 3.78 | — | — | — |
| Toluidine | DE-p-T | 0.8 | 0.8 | 0.8 | 0.8 |
| Inventive Accelerator | NHS | — | — | 3.78 | — |
| | NTS | — | — | — | 3.78 |
| Peroxide | CHP | 1.8 | 1.8 | 1.8 | 1.8 |

The Base Anaerobic was prepared from the following components in the noted parts by weight:

| Component | Parts |
|---|---|
| Polyethylene glycol (PEG) dimethacrylate | 62.67 |
| Polyethylene glycol (PEG) 200 mono oleate | 26.13 |
| Chelator | 0.80 |
| Stabilizer | 1.50 |

C. Physical Properties

Break and Prevail Strengths

For the break/prevail adhesion tests, the specimens were maintained at ambient temperature for a number of time intervals, and evaluated for performance. The time intervals were: 15 minutes, 30 minutes, 1 hour, 2 hours, 4 hours, 24 hours and 120 hours. The break and prevail torque strengths were observed and recorded for the specimens at ambient temperature for these time intervals. The torque strengths were measured on a calibrated automatic torque analyzer.

Figure 2:
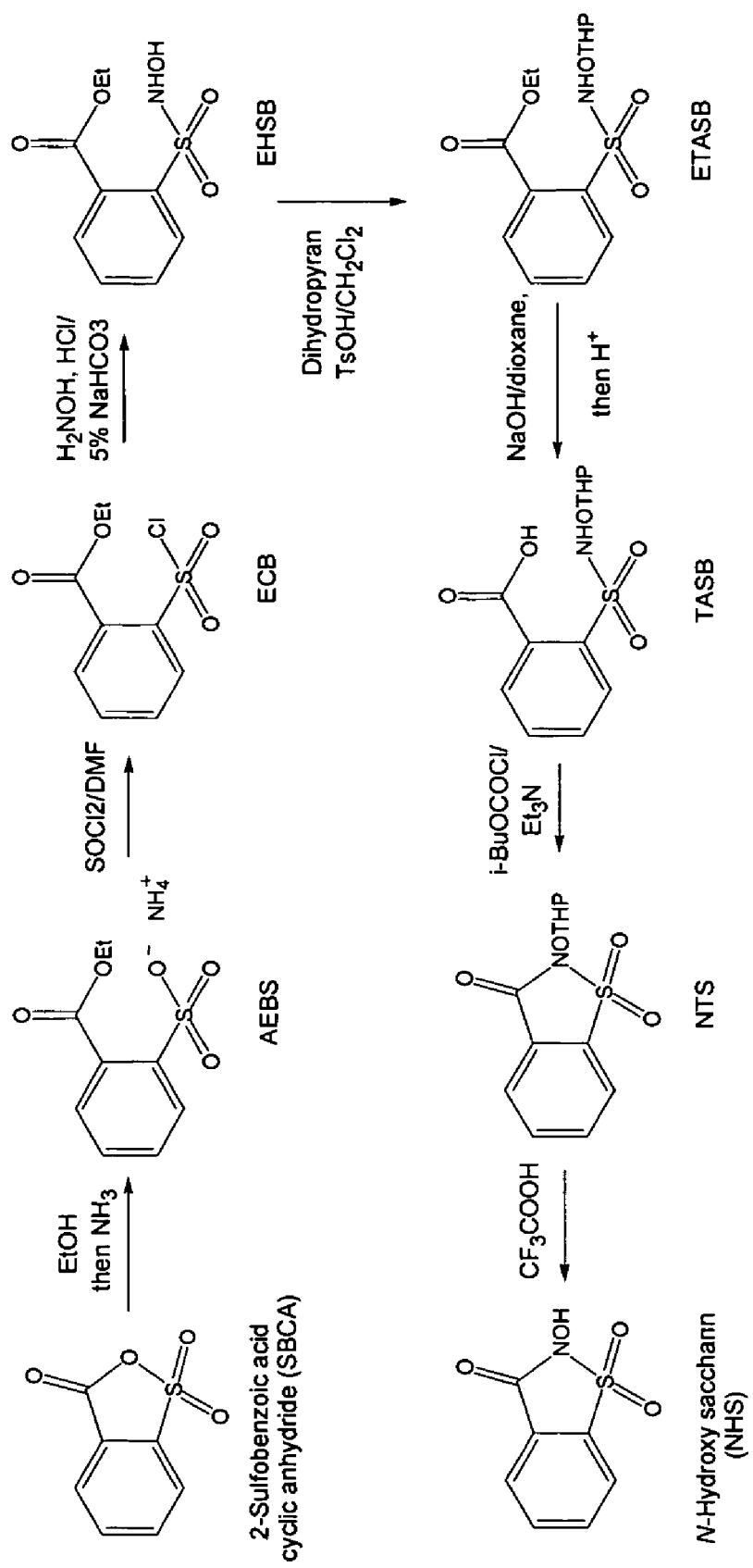
FIG. 2 depicts a synthetic scheme to prepare the sulfonamide, NHS, used in the inventive compositions. The synthetic method was derived from Nagasawa et. al., *J. Med. Chem.*, 38, 1865-1871 (1995).

The data for these evaluations is illustrated in FIGS. 1 and 2.

Sample A (with saccharin) and Sample B (without saccharin or a derivative thereof) are shown as comparisons against Samples C and D (with two representative saccharin derivatives). The torque in breakloose and prevail mode for each sample at the 15 and 30 minute intervals are roughly the same. At the 1 and 2 hour intervals, the torque in prevail mode are roughly the same. The torque in breakloose mode for the inventive samples at the 1 hour interval does not seem to match the comparative sample with saccharin, though they seem to produce somewhat better results at longer cure times depending on the time interval.

More specifically, these data indicate that the anaerobic cure accelerators in accordance with this invention functioned in anaerobic (meth)acrylate-based adhesives at room temperature like traditional anaerobic (meth)acrylate-based adhesives when applied and cured on the substrates, though not as well as those anaerobic (meth)acrylate-based adhesives accelerated with saccharin in the breakloose mode.

It has long been thought that one of the reasons for saccharin's effectiveness in the anaerobic adhesive cure system is its weak acidity, because of the presence of an acidic H atom, which is attached to the N atom. It has been proven that an acid-base reaction occurs on metal surfaces between saccharin and the metal to form a metal salt, as shown below,

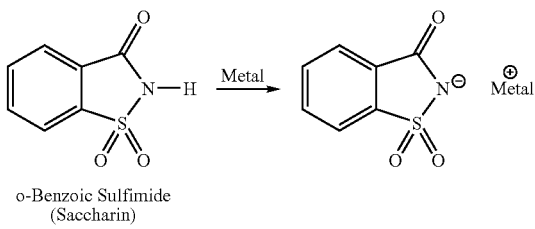

o-Benzoic Sulfimide
(Saccharin)

which assists in initiating cue of the anaerobic adhesive (see F. J. Boerio, et al.). However, the possibility for such an acid-base reaction does not exist for II or III, because neither material contains an analogous acidic H atom.

These derivatives are useful in anaerobic curable compositions as a replacement for some of or all of the saccharin typically used as an accelerator. The saccharin derivatives display good solubility, stability and anaerobic activity.

Both derivatives have accelerated activity when used in combination with DE-p-T and CHP, rendering each useful to replace some or all saccharin.

What is claimed is:

1. An anaerobic curable composition, comprising:
    (a) a (meth)acrylate component; and
    (b) an anaerobic cure-inducing composition comprising an anaerobic cure accelerator compound within structure I

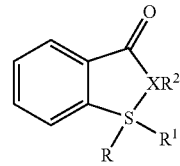

wherein R and R$^1$ may or may not be present, but when at least one is present it is =O; X is N or S; and R$^2$ is hydroxyl or alkoxy.

2. The composition according to claim 1, wherein the (meth)acrylate component is represented by H$_2$C=CGCO$_2$R$^1$, wherein G is a member selected from the group consisting of H, halogen and alkyl having from 1 to about four carbon atoms, and R$^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth) acrylate, hexanediol di(meth)acrylate, and trimethylol propane tri(meth)acrylate.

4. The composition according to claim 1, wherein in the anaerobic cure accelerator R and $R^1$ are each =O and $R^2$ is hydroxyl or an alkoxy.

5. The composition according to claim 1, wherein the accelerator is a member selected from the group consisting of

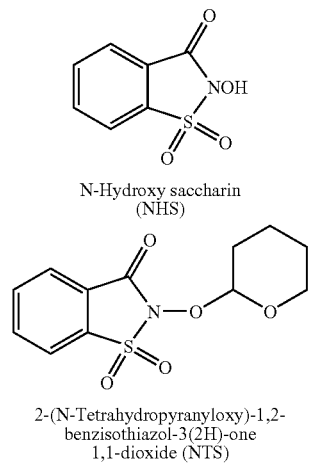

N-Hydroxy saccharin
(NHS)

2-(N-Tetrahydropyranyloxy)-1,2-
benzisothiazol-3(2H)-one
1,1-dioxide (NTS)

6. The composition according to claim 1, further comprising a peroxide compound.

7. A method of preparing an anaerobic curable composition, comprising the step of:
   mixing together:
   a (meth)acrylate component,
   an anaerobic cure inducing composition substantially free of saccharin and
   an anaerobic cure accelerator compound in accordance with claim 1.

8. The composition according to claim 1, wherein the anaerobic cure-inducing composition comprises the combination of a free radical initiator and a free radical co-accelerator.

9. An anaerobic curable composition, consisting essentially of:
   (a) a (meth)acrylate component;
   (b) an anaerobic cure-inducing composition; and
   (c) an anaerobic cure accelerator compound in accordance with claim 1; and
   (d) optionally, one or more additives selected from the group consisting of free radical initiators free radical co-accelerators, free radical inhibitors, metal catalysts, thickeners, non-reactive plasticizers, fillers, and toughening agents.

* * * * *